June 14, 1960  C. B. BAZZONI ET AL  2,940,536
METHOD AND APPARATUS FOR ANALYSIS OF SEISMIC RECORDS
Filed March 2, 1953

INVENTOR.
CHARLES B. BAZZONI
LACOSTE G. ELLIS &
ALFRED C. WINTERHALTER

INVENTOR.
CHARLES B. BAZZONI
LACOSTE G. ELLIS &
ALFRED C. WINTERHALTER
ATTORNEYS

June 14, 1960  C. B. BAZZONI ET AL  2,940,536
METHOD AND APPARATUS FOR ANALYSIS OF SEISMIC RECORDS
Filed March 2, 1953  5 Sheets-Sheet 5

*INVENTOR.*
CHARLES B. BAZZONI
LACOSTE G. ELLIS &
ALFRED C. WINTERHALTER
BY
ATTORNEYS

United States Patent Office 2,940,536
Patented June 14, 1960

2,940,536

METHOD AND APPARATUS FOR ANALYSIS OF SEISMIC RECORDS

Charles B. Bazzoni, Wallingford, Pa., and Lacoste G. Ellis and Alfred C. Winterhalter, Beaumont, Tex., assignors to Sun Oil Company, Philadelphia, Pa., a corporation of New Jersey Filed Mar. 2, 1953, Ser. No. 339,882

9 Claims. (Cl. 181—.5)

This invention relates to a method and apparatus for analyzing the seismic records produced in geophysical prospecting.

It is customary practice in the art of geophysical prospecting to obtain records from a plurality of detector stations in response to an explosive shot which may be fired in the vicinity of the surface of the earth, either in the air, or on or beneath the surface. There may be as many as twenty to thirty detectors or more disposed in a definite pattern over the surface of the earth which receive energy from the shot in the form of waves reflected from various subsurface earth strata.

It is quite common to produce records from a plurality of successive shots, the records from each of the shots being picked up by strings of detectors which extend in opposite directions away from the shot point and in a straight line along the surface of the earth.

The records made in the field may conveniently be in the form of magnetic recordings in which all of the records made from a single shot are recorded side by side on a single magnetic tape. These records are brought to a laboratory for reproduction at which time the original records are filtered and otherwise modified to accentuate the maximum possible amount of information which normally exists in the seismic records.

The filtered and modified records are reproduced on photographic film by means of a photographic oscillograph and the individual records as obtained by each of the detectors may then be studied and compared. Alternatively or additionally, the magnetic records, with or without filtering and/or modification may be combined and reproduced on photographic film for study and comparison.

The visual study and comparison of these individual records is difficult because of various factors which serve to cause displacements between related portions of the records of adjacent detectors.

Broadly, it is an object of this invention to provide a method and apparatus in which a plurality of pick-up heads are positionally adjusted with relation to each other as a multichannel tape is passed thereover in order to simultaneously reproduce each of the individual records obtained from each of a plurality of detector stations in corrected time relation such that the various factors giving rise to displacements among the records are properly correlated and that visible recordings of the individual records made thereafter may be directly compared.

More specifically, the factors giving rise to displacements of records obtained from adjacent detectors include first a displacement which is both independent and fixed for each detector. This displacement results from differences in elevation of adjacent detectors with respect to each other and the depth and characteristics of the weathered earth layer in the vicinity of each of the detectors. When a shot is fired, an electrical signal accompanying the firing of the shot with respect to time is recorded on the record of each of the detector stations. This gives a zero time reference, and, if local conditions of elevation and characteristics at the detectors were the same, this signal would also serve as a common positional reference for the records. But the individual detector elevation and the effect of the weathered layer adjacent to the detector give rise to a time displacement of the seismic recordings at each detector station which is independent for each detector and constant throughout the recording interval thereof.

It is, therefore, a further object of this invention to provide, when the records are reproduced in the laboratory, a correction which is for each of the recordings a fixed correction and corresponds to the record displacement caused by each individual detector elevation and the adjacent weathered layer.

As a result of the difference in displacement between each of the detector stations and the shot point, there will appear a time displacement among the records made at each of the detector stations. This displacement is commonly termed "step-out." It is dependent upon the spacing of each of the detectors from the shot point and is variable for depth of recording for each detector. The amount of step-out decreases with the depth from which reflected waves are received at any particular detector. A step-out adjustment is desirable in order that the reflected waves reaching each of the detectors from a horizontal stratum will appear on the reproduced records at similar positions, i.e., corresponding to each particular depth of reflection. The normal step-out adjustment required can be calculated from known earth velocities in any particular region and the distances between the detectors and the shot point.

It is a further object of this invention to provide, when the records are reproduced in the laboratory, a relative correction in the reproduced records which is dependent for each detector upon the position of that detector and variable with depth for each detector to provide a progressive displacement in the records of each detector to compensate for the normal step-out displacement.

An additional step-out correction is required when a particular stratum from which reflected waves are received is not horizontal. When the stratum is sloping, the effect of the slope is to increase or decrease the apparent step-out depending upon the component of the slope in the direction of the detector array from the shot point. This dip step-out will be variable for each detector with the particular stratum dip and will depend upon the depth in the earth at which the stratum exists.

It is, therefore, an object of this invention to provide, when the records are reproduced in the laboratory, a relative correction in the reproduced records which may be made variable with stratum dip at any depth in the earth.

A still further correction desirably made is that which is necessitated by the fact that the velocity of the seismic waves through the earth increases with depth. Thus, when the originally recorded seismic records are made at the detector stations and the record tape is run at a constant speed, the resultant record has a constant time scale rather than a constant depth scale.

It is a further object of the invention to provide, when the records are reproduced in the laboratory, a variable speed of travel of the record sheet upon which the resultant corrected records are reproduced in order that the reproduced records will have a constant depth scale rather than a constant time scale such as existed in the original records.

It is a further object of this invention to provide apparatus by means of which these various corrections may be made simultaneously during the reproduction of original record signals from a multichannel record tape. Thus the simultaneously reproduced and corrected signals may be fed into a suitable multichannel recording oscillograph to produce visible reproductions in corrected form of the records obtained by each of the detectors, the reproduced records being such that, when placed side by side, they may be directly related with a common depth scale and thus the reading thereof may be greatly facilitated.

These and other objects of the invention will become apparent from the following description when read in conjunction with the accompanying drawings, in which.

Figure 1:
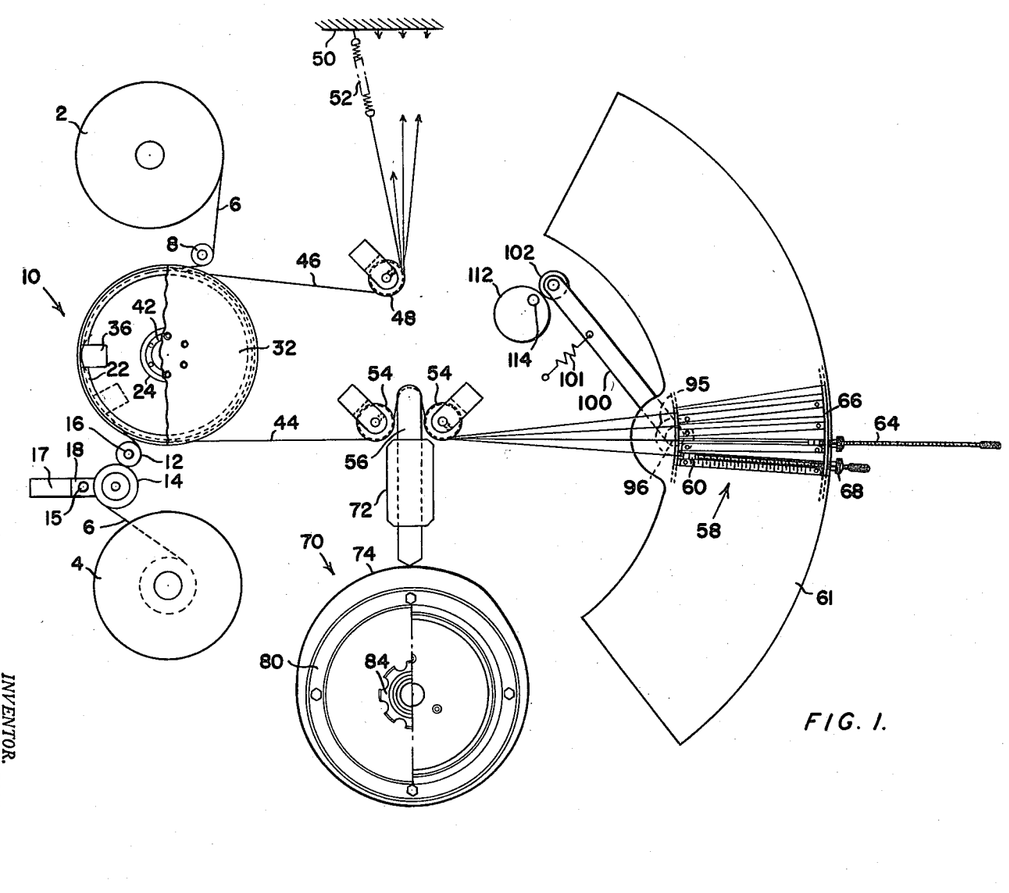
Figure 1 is a diagrammatic showing of the apparatus involved in this invention.

In Figure 1 there are shown record tape mounting reels 2 and 4 which are adapted to carry a record tape 6 containing the records obtained from a plurality of detector stations. As previously indicated, this tape will generally carry approximately twenty to thirty or more record channels. The tape in passing from reel 2 to reel 4 passes over a guide roll 8, a plurality of pick-up head mounting discs indicated generally at 10 and a drive roll 12 which acts in conjunction with an idler roll 14. The drive roll 12 is driven through the shaft 16 by a suitable driving means as will be described. The reel 2 is frictionally retarded and the takeup reel 4 is frictionally driven. The idler roll 14 is mounted on an arm 18 pivoted at 15 and having a weighted end 17. The pivoted idler is so arranged and weighted that when the drive roll is stationary the idler falls away from the drive roll 12. The motion of the tape as it is drawn taut by the takeup reel 4 tends to increase the pressure of the idler against the tape as it passes over the drive roll. This arrangement permits considerable slippage of the tape during the starting and stopping periods and the purpose of the arrangement is to conserve the use of the magnetic tape during these starting and stopping periods.

Figure 3:
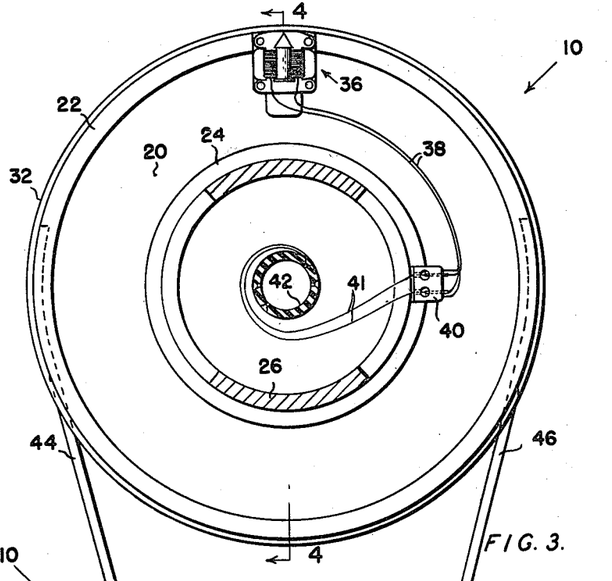
Figure 3 is an enlarged showing of one of a plurality of record channel pick-up head mounting discs shown in Figure 1.
Figure 4:
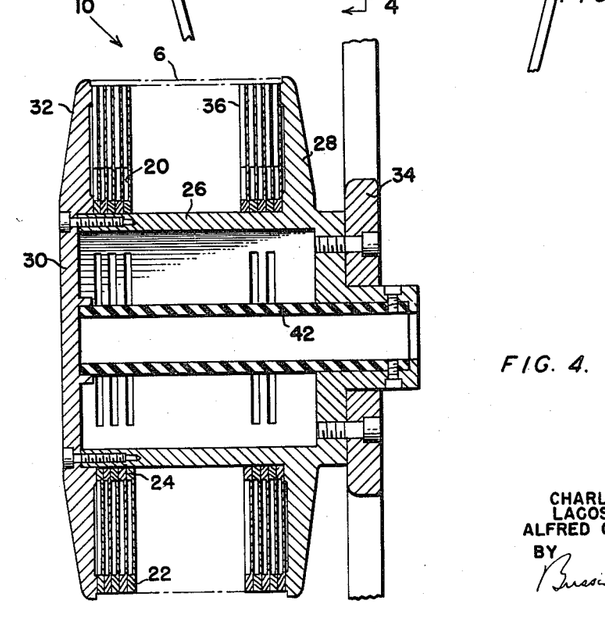
Figure 4 is a transverse section of the stack of pick-up heads taken on the plane indicated by the trace 4—4 in Figure 3.

The pick-up head mounting discs, indicated generally at 10 in Figure 1, are shown in greater detail in Figures 3 and 4. Each of the discs 20 is provided with an outer rim 22 and an inner rim 24. The discs are rotatably mounted on a barrel member 26 which is provided with a rear supporting flange 28 and a front cap 30 providing a supporting flange 32. The barrel member 26 may be attached to any suitable mounting means 34.

Each of the discs 20 supports a pick-up head shown generally at 36 in Figure 3. Lead wires 38 pass from the pick-up head to the inner rim 24 of the disc 20 and, by a suitable insulating and connecting block 40, are connected to lead wires 41 which are attached to the member 42. Connections may be conveniently made with the lead wires 41 on the insulated sleeve member 42, the connections, not shown, passing from the interior of the sleeve 42. As shown in Figure 4, a plurality of the pick-up head mounting discs 20 are mounted adjacent to each other and the record tape 6 is passed over the portions of the discs mounting the pick-up heads, the spacing between the guide flanges 28 and 32 being only slightly greater than the width of the tape in order to properly position the tape and the record channels thereon with respect to the pick-up heads.

A pair of cables 44 and 46 are connected to the rim 22 of each of the rotatably mounted discs. The discs may be rotatably positioned on the barrel 26 by actuation of the cables 44 and 46.

As shown in Figure 1, the cables 46 extending from the discs 20 are passed over suitable guide rollers 48 and are yieldingly attached to a mounting plate 50 by means of springs 52. The cables 44 pass under guide rollers 54 and over the ends of a plurality of cam followers 56 as will be hereinafter described, and are individually anchored to adjustable anchorages shown generally at 58 in Figure 1.

Figure 5:
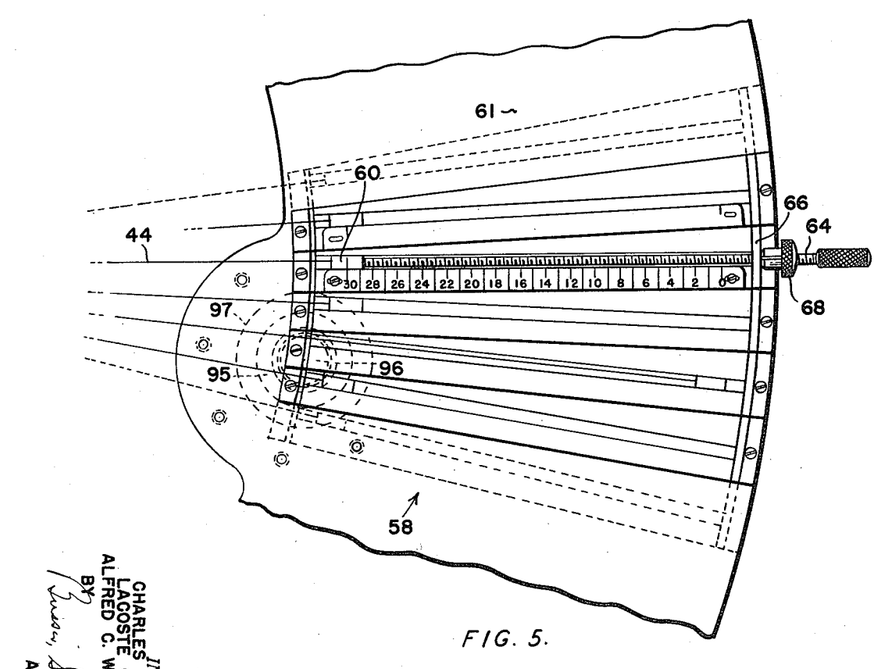
Figure 5 is an enlarged showing of a fragmentary portion of the apparatus shown in Figure 1 providing the fixed time adjustment for each of the record channels.
Figure 6:
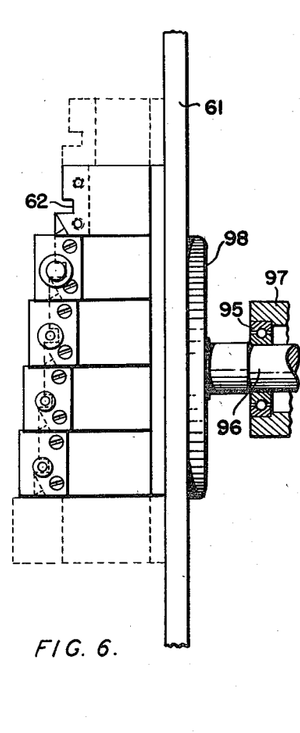
Figure 6 is a side view of the apparatus shown in Figure 5.

As shown in greater detail in Figures 5 and 6, each of the cables 44 is attached to a slidable block 60 which is mounted in a suitable guide-way 62. The block 60 is connected to a threaded member 64 which extends through a plate 66. A knurled nut 68 is threaded onto the member 64. It will be evident that rotation of the nut 68 with respect to the member 64 will displace the member 64 and will cause the slidable block 60 to be adjustably positioned within the guide-way 62. The knurled nut 68 will be held against the plate 66 as a result of the tension on the cable 44 as provided by the spring 52 acting through the cable 46. Each of the cables 44 is attached to similar mounting means. The twenty to thirty cable mounting means as are required to adjust the positions of the twenty to thirty pick-up head mounting discs are mounted on the plate 61.

In Figure 1 there is shown generally at 70 a stack of cams 74. With each of the cams there is associated a cam follower 56. The cam followers are slidably mounted in suitable mounting means 72, and each of the cables 44 leading from the pick-up head mounting discs to the cable end mounting means passes over a cam follower. Thus each of the cables is acted upon by a cam follower and each of the cam followers is acted upon by a cam.

Figures 2, 12:
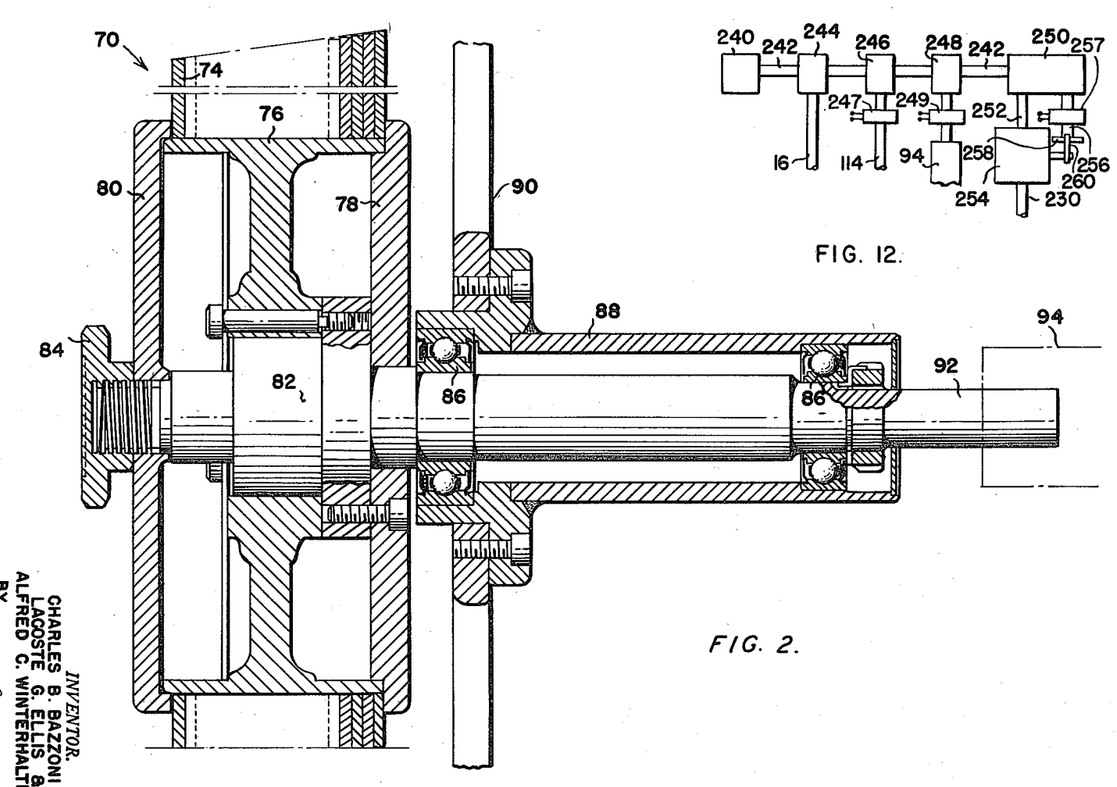
Figure 2 is an enlarged showing of a transverse section of the portions of the apparatus shown in Figure 1 and employed to provide normal dip correction.
Figure 12 is a diagrammatic showing of the driving mechanism employed in driving the apparatus shown in Figures 1 and 11.

The cams 74 and the cam mounting apparatus are shown in greater detail in Figure 2. The cams are mounted in a stack upon a barrel member 76 which is supported between plates 78 and 80. The barrel member 76 and the plate 78 are affixed to a rotatable shaft 82. The plate 80 is positioned on the shaft 82 by means of the threaded member 84 which is threaded onto the end of shaft 82 and bears against the plate 80. The shaft 82 is rotatably mounted in bearings 86. The bearings 86 are mounted in a suitable housing 88 which is attached to mounting plate 90. The extended end 92 of the shaft 82 is connected by means of a suitable coupling 94 indicated in construction lines and through suitable gearing to the same drive which drives the tape drive roll 12 as will be described. Rotation of the shaft 92 by the driving means will cause the cams 74 to rotate and the cam followers 56 will each be actuated within the guide 72 in response to the contour of its associated cam 74. Motion of any one of the cam followers 56 will result in motion of its associated cable 44 between the guide rolls 54 and will thus cause rotation of its associated pick-up head mounting disc 10 either against or in the direction of the urging of the spring 52 connected to its associated cable 46.

The plate 61 mounting the adjustable cable anchorages 58 is mounted on the shaft 96 which is rotatably mounted in bearings 95 mounted in suitable mounting means 97. The shaft 96 is rigidly connected to the mounting plate 61 through a plate 98. One end of an actuating arm 100 is rigidly attached to the plate 98. Mounted on the other end of the actuating arm 100 is a roller 102.

A cam 112 is mounted on a shaft 114. The roller 102 is held in engagement with the cam by the action of a spring 101. If it is assumed that the cam 112 is shown to be in a neutral or zero position, rotation of the cam 112 in a clockwise direction, as viewed in Figure 1, for half a revolution will rock the mounting plate 61 and the shaft 96 in a clockwise direction. Further rotation of the cam 112 in a clockwise direction will permit the mounting plate 61 to be rotated in a counterclockwise direction by the action of the spring 101 as the cam returns to its starting position. The plate 61 is arcuately formed with its center of radius being located approximately at the lower edge with the roller 54 where the cables 44 come into alignment. Thus the positions of the ends of the cables 44 may be relatively adjusted depending upon the contour and degree of rotation of cam 112. The driving shaft 114 may be coupled through suitable gearing to the driving means hereinbefore referred to in order that the cam 112 will rotate a predetermined degree during the time interval in which the record tape is being transferred from the reel 2 to the reel 4 over the recording heads. The actual contour of the cam 112 employed for the correction of any particular set of records will be dependent upon the variation in the slope of the various earth strata indicated by those records. Preferably, only one-half a revolution of a cam will be employed to effect the record correction and the remaining portion of the revolution will be employed for returning the cam to its zero position.

As previously described, the record tape 6 containing the multichannel recordings obtained from a plurality of detector stations is mounted on the reel 2. This tape is then drawn over the pick-up heads 36, which are mounted on the pick-up head mounting discs, by the tape driving roll 12, and is taken up by the frictionally driven reel 4.

In order to provide independent adjustment of each of the records to produce reproduced records corrected for the effects of the weathered earth layer surrounding each of the detectors and for variation in individual detector elevation, the adjustable anchorages, shown generally at 58 in Figure 1, are adjusted to displace the pick-up heads 36 to a degree sufficient to make the necessary relative correction for each record channel. This relative correction between record channels remains constant during the entire time the original record is being played back.

To correct for the normal step-out among detectors, which is independently variable with depth for each detector, the various cams 74, each of which acts upon a cam follower 56, are contoured to the degree necessary so that the relative lowering of the cam followers in Figure 1 results in relative lengthening of the cables 44 attached to the pick-up head mounting discs and each pick-up head is, as a result thereof, displaced with respect to the other pick-up heads to such a degree as is necessary to provide the proper relative correction between the record channels. After a study of velocity and step-out data for a given area, from which a table may be set up for each record channel showing the necessary time delay or step-out corrections to be imposed on a number of points throughout the length of time of each record channel, the layout of each of the cams may be plotted.

The cams are preferably formed so that one-half of their circumference is contoured to provide step-out correction and, during the normal running of the record tape for reproduction of the records thereon, the cams will be rotated through 180°. After a record is run, continued operation of the driving means may be employed to return the cams to their zero or starting position. It will be evident that the contours of these step-out cams will vary depending upon the conditions of the earth strata in the region in which the records are being made, and the relative displacements provided by the cams in the stack will be adjusted in consideration of the relative displacement between the various detector stations and the shot point.

After the apparatus has been adjusted to reproduce the original seismic records in a form corrected by the fixed correction for each detector station and the normal step-out correction, the slope correction may be considered. The normal step-out correction will provide corrected records which when viewed side by side will show indications of a horizontal stratum in horizontal relationship. When a dip occurs, however, the component of the dip of the particular stratum in the direction of the line of detectors will serve to increase or decrease the apparent step-out, and it is necessary to adjust independently each portion of the records responding to an inclined stratum to the degree necessary to compensate for the apparent step-out created by the dip. It should be noted that this correction must be made in consideration of the degree of the component of the slope of any particular stratum and the depth at which that stratum is encountered. The cam 112 may be formed to provide this correction. It will be evident that the cam may be replaced by various other means which may be adjusted to displace the arm 100 in either direction to any desired extent for the time during which any portion of the record tape is passing over the pick-up heads.

Figure 11:
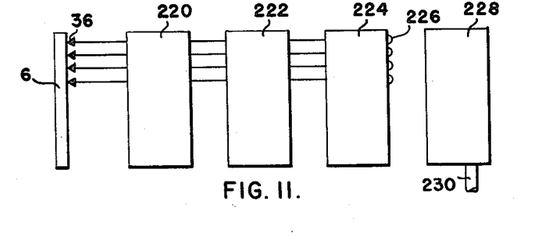
Figure 11 is a wiring diagram illustrating the electrical apparatus associated with the pick-up heads.

In Figure 11 there is shown diagrammatically the electrical apparatus by means of which the original records are reproduced in corrected and visible form. The record tape 6 passes over the individual pick-up heads 36. The signals picked up by the pick-up heads are delivered to individual amplifiers indicated at 220, and the outputs of these amplifiers are fed through individual filters 222 and to individual galvanometers 224 which may be of the usual type designed to project beams of light through lens systems 226 upon a sensitized sheet contained within a camera 228, the sheet being driven by means of a shaft 230.

The shaft 230 may be driven by any driving means suitable to provide the variable speed drive required in order that the reproduced corrected records will be linear with depth. It will be apparent that such a drive may be conveniently provided, for example, by means of a master driving motor and a cam actuated speed control apparatus which will adjust the speed of the shaft 230 in response to the contour of the cam. Thus, by providing various control cams, various speed correction rates may be readily obtained. Numerous types of driving apparatus are well known to the art which will satisfactorily provide the type of variable speed drive required herein. This correction is preferably provided in the reproduction of the records after the original signals have passed through the filter circuits. It will be evident that if the speed of the records were varied before they passed through the filter circuits the frequency of the originally recorded signals would be affected.

In Figure 12 there is shown a driving mechanism for the various elements of the apparatus which have been described. This mechanism includes a motor 240 connected to an extended shaft 242 which passes through various gear boxes. The shaft 16 of the tape drive roll 12 is connected to the shaft 242 through a gear box 244. The shaft 114 of the cam 112 is connected to the shaft 242 through a gear box 246 and a magnetic clutch 247. The coupling 94 on the step-out drive shaft 92 is driven by the shaft 242 through a gear box 248 and a magnetic clutch 249. It will be evident that the gear ratios provided by the various gear boxes 244, 246 and 248 will be such that the number of revolutions of each of their associated drive shafts over a predetermined period of time will be properly related.

The camera drive shaft 230 shown in Figure 11 is driven by a variable speed driving means 254 which is, in turn, driven by a shaft 252 from a gear box 250 on shaft 242. Also driven from the shaft 242 through a gear box 250 and a magnetic clutch 257 is a shaft 256 on which is mounted a cam 258 which actuates a lever 260. The lever 260 serves to control the output speed of the variable speed driving apparatus 254.

It will be evident that, by the employment of variously formed cams in the location of cam 258, various rates of change of speed of the camera drive shaft 230 may be obtained during the period of operation of the apparatus and, by properly selecting the cam in accordance with the velocity of the seismic waves through the various earth strata, the signals picked up by the pick-up heads and delivered to the galvanometers 224 will be recorded on the sensitized sheet within the camera 228 with a scale linear with depth as previously described rather than linear with time as originally recorded.

The magnetic clutches 247, 249 and 257 are provided to secure synchronization. It is practically impossible to put the magnetic tape record on the machine in such a manner that synchronization will occur on the starting of the tape drive. In the mechanism described, the tape drive is started and the reproduction of the shot instant signal from the tape provides a signal causing engagement of the magnetic clutches through a conventional electronic relay apparatus. The cams are, of course, all set in their zero starting positions, with the clutches disengaged, before motor 240 is started. Since the seismic record starts with the shot instant signal, synchronization is accomplished.

Figures 7, 8:
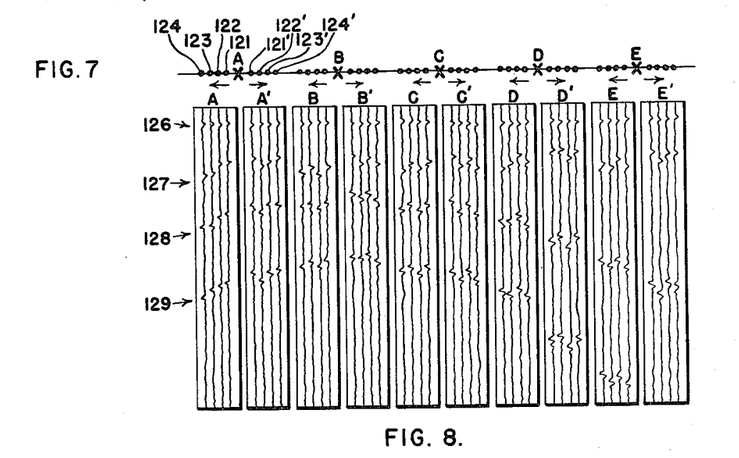
Figure 7 is a diagrammatic showing of a plurality of shot points and the array of detector stations associated with each of the shot points.
Figure 8 is a representation of typical uncorrected records obtained at each of the detector stations of Figure 7.

By means of the apparatus hereinbefore described, the individual originally recorded records on a record tape carrying a plurality of records as received at a plurality of detectors from a single shot may be corrected and reproduced. Figure 7 shows diagrammatically at A, B, C, D and E a plurality of such shot points and their associated detector stations 121–124 and 121'–124'. Figure 8 shows, in visual form, typical uncorrected records as originally obtained at a plurality of recording stations and recorded on multichannel magnetic record tapes. The records on record tapes A and A' are obtained, when the shot A is fired, from the recorders 121–124 and 121'–124'. While for convenience there are shown here only four channels on each of the tapes, as has been described above, more conventionally, each of the tapes will carry records from a large number of recorder stations. Each of the shots B, C, D and E similarly is recorded on record tapes and produce records which are shown, in visual form, at B—B', C—C', D—D' and E—E'. On each of the records as produced by each recorder there exists an initial or timing mark 126 and, as indicated generally at 127, 128 and 129, record responses which are indicative of subsurface strata.

If the various original uncorrected records are reproduced in visual form and positioned with their timing marks 126 in a horizontal line as shown in Figure 8, the portions of the records indicated generally at 127, 128 and 129 which indicate vital information are considerably displaced and distorted with respect to each other as a result of the various time displacements which have been hereinbefore described as normally occurring in the procurement of these records.

If it be assumed that the detectors 121 and 121' are placed equally distant from the shot point A and that the stratum giving rise to the record 127 be a horizontal stratum, then those record indications for record channels 121 and 121' should be in alignment with each other when the timing marks of these two records are in alignment. The misalignment indicated in Figure 8 results from the fixed displacement between the output signals of these two detectors resulting from either the weathered layer or differences in detector elevation or both. Similar fixed displacements occurring between record channels 122 and 122', 123 and 123' and 124 and 124' may similarly be attributed to these fixed factors.

A further cause for record displacement is detector step-out. For example, it will be evident that the step-out of the record channel 124 is greater than the step-out of record channel 121 and, similarly, the step-out of the record channel 124' is greater than the step-out of the record channel 121'. If the portion of the records indicated at 127 is indicative of a horizontal stratum this line of reflection should appear as a horizontal formation. However, as a result of the normal step-out and the individual detector fixed displacements, the line of reflection appears to assume an irregular saw-toothed formation.

The records 128 and 129 shown in Figure 8 indicate a dip in the stratum giving rise to these records and, while in the instance chosen the sloping stratum slopes smoothly, the records 128 and 129 are quite erratic. The displacement of the pertinent data on each of these records occurs both as a result of the normal step-out of the detector stations and the additional step-out effects resulting from stratum slope as has been described as well as from variations in the individual detector fixed displacement.

The first correction is made by means of the individual recording head adjusting apparatus shown at 58 in Figure 1 by means of which the reproduced records may be displaced with respect to each other to the degree necessary to compensate for the variations in the individual detector fixed displacement. As previously discussed, this compensation remains constant during the entire time each record tape is played back.

The second correction is made by means of the cams shown generally at 70 in Figure 1 and their associated cam followers 56 which are provided to displace the recording heads with respect to each other during the period of original record play back to adjust the step-out differences between the various detectors. As a result of this and the previously described correction, the portions of the recordings on sheet A responsive to the horizontal stratum will be made to appear in plane relation and in a horizontal line as indicated at 127' in the corrected reproduced record shown in Figure 9. This correction will not transform indications of a sloping strata to records in a horizontal line. This is because of the apparent or dip step-out caused by the slope of the strata, and this result of slope is indicated in the sloping alignments of the recordings at 128' and 129'.

The third correction is the dip step-out correction. It is accomplished by the cam member 112 and the follower 102 which serve to rotate the mounting plate 61 carrying the secured ends of each of the wires 44. This dip step-out correction, when combined with the normal step-out correction, displaces the individual record channels by changing the pick-up positions to correct the remaining erratic conditions existing in the positions of the portions of the records indicating sloping strata and provides, in conjunction with the prior corrections, a recording of a type not illustrated, in which the reflections corresponding to 128' and 129' would be in horizontal alignment as in the case of those at 127'.

In actual practice, however, it is difficult to obtain complete dip correction and there is, rather, applied by cam 112 a correction corresponding to the component of normal or average dip for the area. Any abnormal dip will then appear as a deviation from the horizontal alignment of the records of the reflections.

Figure 9:
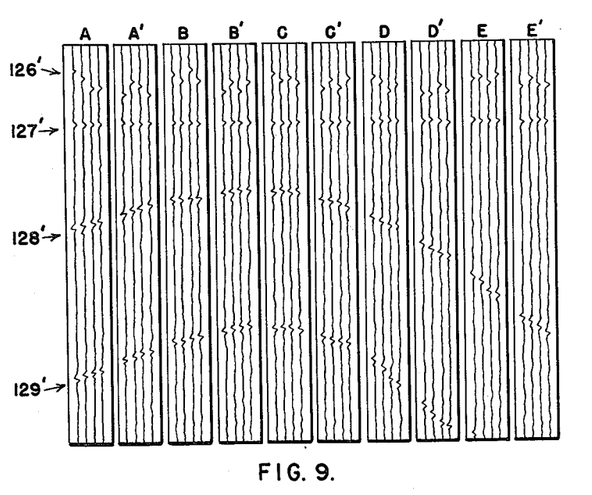
Figure 9 is a representation of typical partially corrected records obtained at each of the detector stations of Figure 7.
Figure 10:
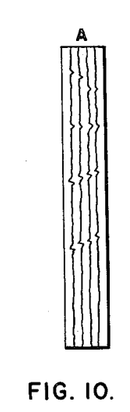
Figure 10 is a showing of one of the records of Figure 8 embodying all of the aforementioned corrections with the exception of the depth scale correction.

As has been hereinbefore described, records obtained in the field are preferably recorded on tape which is run at constant speed when the records are made and thus, as the result of the change in the velocity of transmission of the seismic signal with depth, the records shown in Figure 8 have a linear time scale and a non-linear depth scale. By properly adjusting the rate of speed at which the record sheets A, A', B, B', etc. are run through the camera 228 by the shaft 230, the corrected records shown in Figure 9 are made linear with depth. In Figure 10 there is shown a reproduction fo the original record on record tape A to which all of the corrections involved in Figure 9 have been applied with the exception of the linearity with depth correction. Inasmuch as the rate of signal transmission increases with depth, the record sheet speed must be increased during reproduction of that portion of the tape carrying signals received from greater depth. Thus the corrected record shown in Figure 9 will be elongated in its later portion with respect to a record uncorrected for depth as shown in Figure 10.

When each of the original records have been played back and the corrected records have been visibly reproduced on record sheets, these record sheets (with or without dip corrections) may be placed side by side, as indicated in Figure 9, and provide a clear representation of the subsurface strata conditions. This method of analyzing seismic records provides from a plurality of displaced recordings, such as are obtained when records are made in the field, records which provide a visual picture of subsurface strata to a linear depth scale and their interpretation accomplished with much greater facility than has heretofore been possible.

It should be noted that the production of records linear with depth may be accomplished in conjunction with means not providing the various other compensations provided by the remainder of the apparatus disclosed herein. The copending patent application, Ellis, Serial No. 339,603, filed March 2, 1953, relates to the apparatus disclosed herein and includes claims specifically directed to the production of records having a constant or linear depth scale.

Instead of individually recording the records in the separate channels of a magnetic tape, the tape may be run through the described apparatus with all corrections made and the outputs of the channels may be mixed, the mixing being accomplished in various known fashions. As a result of the corrections described, corresponding reflection signals are reproduced from each channel at the same time and are essentially in phase. Accordingly, the mixing will not involve frequency discrimination or cancellation of the reflections and they will be emphasized because the unwanted signals and noise are usually of random phase and tend to cancel out. The signals resulting from the mixing may be photographically recorded with or without correction to linear depth scale.

Each of the filter circuits employed in the filters indicated generally at 222 in Figure 11 may be any of a plurality of types of filter circuits known to the art. Similarly, there may be incorporated in these circuits various types of mixing circuits, for example, such as has been disclosed in the patent application by Robert L. Henson, Serial No. 151,347, now Patent No. 2,662,126, filed March 23, 1950.

It will, of course, be evident that the separate or mixed outputs from the disclosed apparatus may be reproduced on magnetic tapes rather than photographically, and that the magnetic records thus obtained may, in turn, be subjected to corrections in the apparatus. In this or other fashions the apparatus lends itself to a wide variety of uses which are only exemplified herein.

It will be evident that various modifications may be made in the embodiment of the invention disclosed herein without departing from the scope of the invention as set forth in the following claims.

What is claimed is:

1. The method of seismographic surveying comprising creating at a localized source a disturbance in the earth, producing simultaneous records with respect to time side by side on a record strip of the vibrations resulting from said disturbance at a plurality of detectors differentially located with respect to said source in such a fashion that portions of the records aligned transversely of the strip are simultaneously formed, reproducing said records simultaneously through a plurality of record responsive means, rerecording said records side by side on a second record strip in visible form, positionally adjusting said record responsive means with respect to each other variably during reproduction of the records to compensate for the displacement of vibrations on the various records received from equal depths in the earth due to the differential locations of the detectors with respect to the source of the disturbance, and additionally positioning said record responsive means with respect to each other variably during reproduction of the records to compensate for the displacement of vibrations on the various records received from the same earth stratum due to slope of that stratum.

2. The method of seismographic surveying comprising creating at a localized source a disturbance in the earth, producing simultaneous records with respect to time side by side on a record strip of the vibrations resulting from said disturbance at a plurality of detectors differentially located with respect to said source in such a fashion that portions of the records aligned transversely of the strip are simultaneously formed, reproducing said records simultaneously through a plurality of record responsive means, rerecording said records side by side on a second record strip in visible form, positionally adjusting said record responsive means with respect to each other to a degree fixed during reproduction of the records to compensate for the relative elevations of and earth weathered layer conditions at each of the detectors so that, in the absence of further correction, portions of the records aligned transversely of the rerecorded strip are in response to simultaneously received disturbances, additionally positionally adjusting said record responsive means with respect to each other variably during reproduction of the records to compensate for the displacement of vibrations on the various records received from equal depths in the earth due to the differential locations of the detectors with respect to the source of the disturbance, and additionally positioning said record responsive means with respect to each other variably during reproduction of the records to compensate for the displacement of vibrations on the various records received from the same earth stratum due to slope of that stratum.

3. The method of seismographic surveying comprising creating at a localized source a disturbance in the earth, producing simultaneous records with respect to time side by side on a record strip of the vibrations resulting from said disturbance at a plurality of detectors differentially located with respect to said source in such a fashion that portions of the records aligned transversely of the strip are simultaneously formed, reproducing said records from said record strip simultaneously through a plurality of record responsive means, rerecording said records side by side on a second record strip in visible form, positionally adjusting said record responsive means with respect to each other to a degree fixed during reproduction of the records to compensate for the relative elevations of and earth weathered layer conditions at each of the detectors so that, in the absence of further correction, portions of the records aligned transversely of the rerecorded strip are in response to simultaneously received disturbances, additionally positioning said record responsive means with respect to each other variably during reproduction of the records to compensate for the displacement of vibrations on the various records received from equal depths in the earth due to the differential locations of the detectors with respect to the source of the disturbance, additionally positioning said record responsive means with respect to each other variably during reproduction of the records with the depth and the slope of each particular stratum to compensate for the displacement of vibrations on the various records received from said stratum due to slope of said stratum, and moving one of said record strips at a variable rate of speed selected to compensate for the variation in the velocity of the disturbance with the depth thereof in the earth to provide on said second record strip reproduced records which are linear with depth.

4. Apparatus for the analysis of a plurality of seismographic records recorded side by side on a single record strip of vibrations resulting at detectors located at different points from a source of disturbance in the earth comprising individual record responsive means for each of the records on said strip, means providing relative movement between said record strip and said record responsive means, means operably connected to said record responsive means for rerecording said records side by side on a second record strip in visible form, means for positionally adjusting said record responsive means with respect to each other variably during reproduction of the records to compensate for the displacement of vibrations on the various records received from equal depths in the earth due to the differential locations of the detectors with respect to the source of the disturbance, and means for compensating for the displacement of vibrations on the various records received from the same earth stratum due to slope of the stratum including means for additionally positioning said record responsive means with respect to each other variably during reproduction of the records.

5. Apparatus for the analysis of a plurality of seismographic records recorded side by side on a single record strip of vibrations resulting at detectors located at different points from a source of disturbance in the earth comprising individual record responsive means for each of the records on said strip, means providing relative movement between said record strip and said record responsive means, means operably connected to said record responsive means for rerecording said records side by side on a second record strip in visible form, means for positionally adjusting said record responsive means with respect to each other to a degree fixed during reproduction of the records to compensate for the relative elevations of and earth weathered layer conditions at each of the detectors so that, in the absence of further corrections, portions of the records aligned transversely of the rerecorded strip are in response to simultaneously received disturbances, means for positionally adjusting said record responsive means with respect to each other variably during reproduction of the records to compensate for the displacement of vibrations on the various records received from equal depths in the earth due to the differential locations of the detectors with respect to the source of the disturbance, and means for compensating for the displacement of vibrations on the various records received from the same earth stratum due to slope of the stratum including means for additionally positioning said record responsive means with respect to each other variably during reproduction of the records.

6. Apparatus for the analysis of a plurality of seismographic records recorded side by side on a single record strip of vibrations resulting at detectors located at different points from a source of disturbance in the earth comprising individual record responsive means for each of the records on said strip, means providing relative movement between said record strip and said record responsive means, means operably connected to said record responsive means for rerecording said records side by side on a second record strip in visible form, means for positionally adjusting said record responsive means with respect to each other to a degree fixed during reproduction of the records to compensate for the relative elevations of and earth weathered layer conditions at each of the detectors so that, in the absence of further corrections, portions of the records aligned transversely of the rerecorded strip are in response to simultaneously received disturbances, means for additionally positioning said record responsive means with respect to each other to a degree progressively variable during reproduction of the records to compensate for the displacement of vibrations on the various records received from equal depths in the earth due to the differential locations of the detectors with respect to the source of the disturbance, means for compensating for the displacement of vibrations on the various records received from said stratum due to slope of said stratum including means for additionally positioning said record responsive means with respect to each other variably during reproduction of the records, and means for moving the second mentioned record strip at a variable rate of speed for progressively elongating the latter from the beginning toward the end thereof with respect to the first mentioned record strip thereby to compensate for the variation in the velocity of the disturbance with the depth thereof in the earth to provide on said second record strip reproduced records which are linear with depth.

7. Apparatus for the analysis of a plurality of seismographic records recorded side by side on a single record strip of vibrations resulting at detectors located at different points from a source of disturbance in the earth comprising individual record responsive means for each of the records on said strip, means providing relative movement between said record strip and said record responsive means, means operably connected to said record responsive means for rerecording said records side by side on a second record strip in visible form, and means for compensating for the displacement of vibrations on the various records received from the same earth stratum due to slope of the stratum including means for adjusting said rerecorded records with respect to each other variably during reproduction of the records.

8. Apparatus for the analysis of a plurality of seismographic records recorded side by side on a single record strip of vibrations resulting at detectors located at different points from a source of disturbance in the earth comprising individual record responsive means for each of the records on said strip, means providing relative movement between said record strip and said record responsive means, means operably connected to said record responsive means for rerecording said records side by side on a second record strip in visible form, and means for simultaneously compensating for the displacement of vibrations on the records received from earth strata due to step-out among the detectors and slope of various earth stratum including means for variably positioning said rerecorded recordsd with respect to each other during rerecording.

9. Apparatus for the analysis of a plurality of seismographic records recorded side by side on a single record strip of vibrations resulting at detectors located at different points from a source of disturbance in the earth comprising individual record responsive means for each of the records on said strip, means operatively connected to said record responsive means of rerecording said records side by side on a second record strip in visible form, means operatively connected to said record responsive means and operable for positionaly adjusting said record responsive means with respect to each other variably during reproduction of the records to compensate for the displacement of vibrations on the various records received from equal depths in the earth due to the differential locations of the detectors with respect to the source of the disturbance, and to compensate for the displacement of vibrations on the various records received from the same earth stratum due to slope of the stratum, and means drivingly associated with both record strips aforesaid for moving the first mentioned record strip at a constant rate of speed relative to said record responsive means and for simultaneously moving said second record strip at a variable rate of speed for progressively elongating the records on the latter from the beginning toward the end thereof with respect to those on the first record strip.

References Cited in the file of this patent

UNITED STATES PATENTS

| | | |
|---|---|---|
| 2,243,729 | Ellis | May 27, 1941 |
| 2,394,990 | Eisler et al. | Feb. 19, 1946 |
| 2,427,421 | Rieber | Sept. 16, 1947 |
| 2,440,971 | Palmer | May 4, 1948 |
| 2,463,534 | Hawkins | Mar. 8, 1949 |
| 2,620,890 | Lee et al. | Dec. 9, 1952 |
| 2,732,025 | Lee | Jan. 24, 1956 |
| 2,821,892 | Merten | Feb. 4, 1958 |